No. 804,918. PATENTED NOV. 21, 1905.
A. W. BARNARD.
WEIGHING SCALE.
APPLICATION FILED FEB. 7, 1905.

3 SHEETS—SHEET 1.

Witnesses:
Inventor:
Arthur W. Barnard
By Francis V. Dakin
his Atty

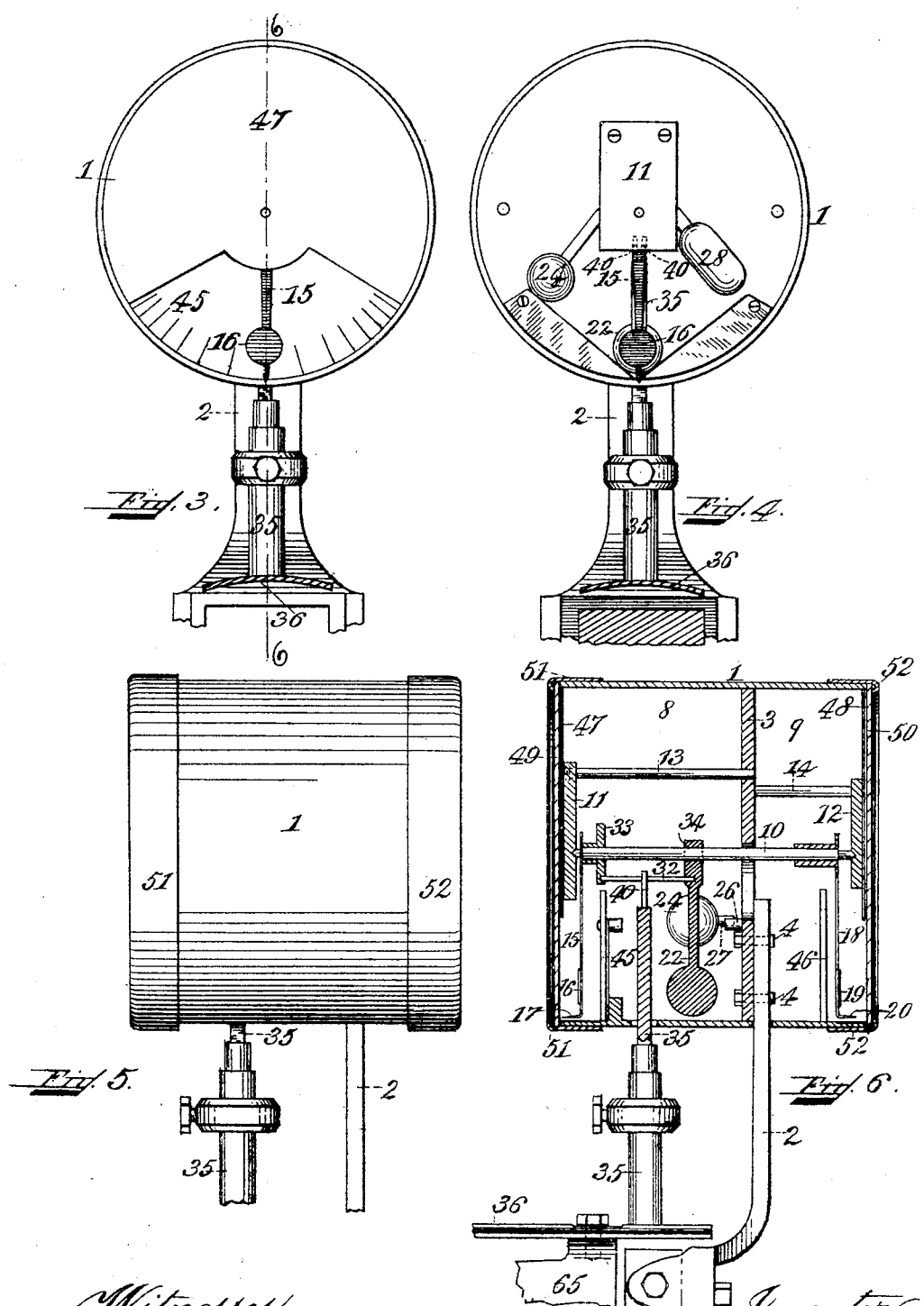

No. 804,918. PATENTED NOV. 21, 1905.
A. W. BARNARD.
WEIGHING SCALE.
APPLICATION FILED FEB. 7, 1905.
3 SHEETS—SHEET 3.
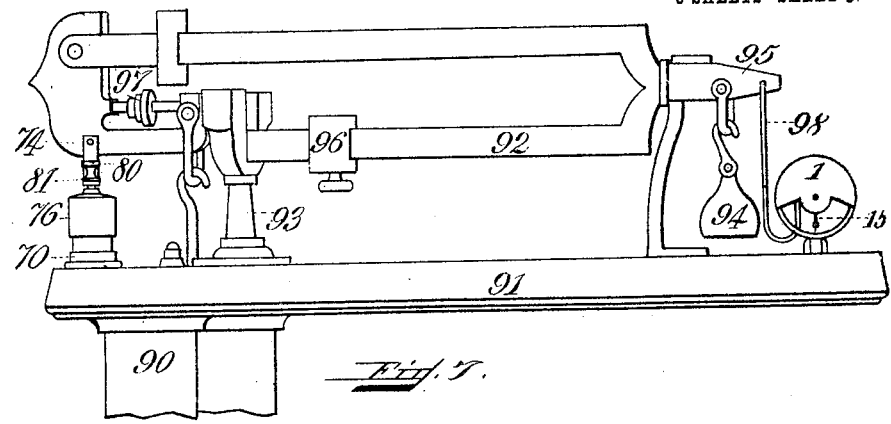
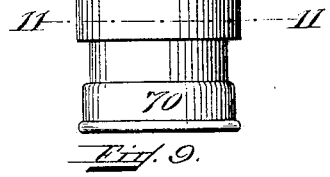
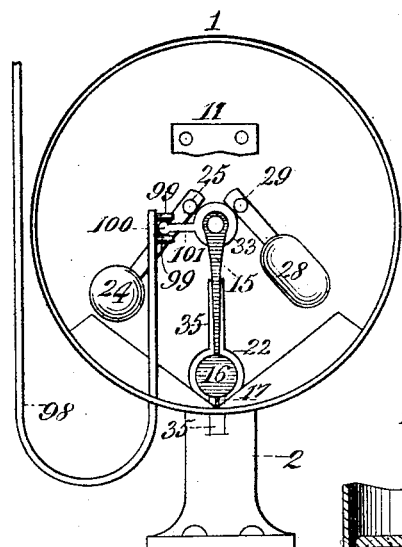
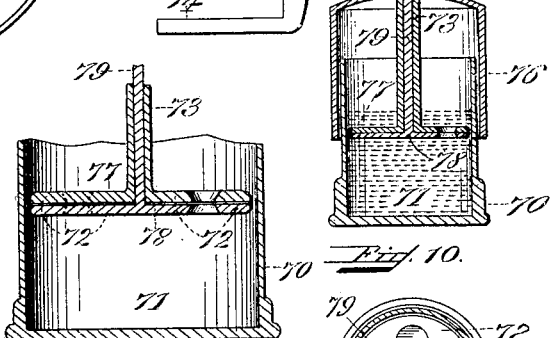
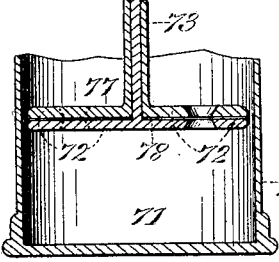
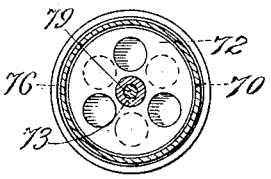
Witnesses:
E. F. Umiac
W. E. Kennick Jr.
Inventor:
Arthur W. Barnard
By Francis N. Oakin
his atty

UNITED STATES PATENT OFFICE.

ARTHUR W. BARNARD, OF NEWTON CENTER, MASSACHUSETTS, ASSIGNOR TO THE BARNARD COMPANY, OF BOSTON, MASSACHUSETTS, A CORPORATION OF MASSACHUSETTS.

WEIGHING-SCALE.

No. 804,918.      Specification of Letters Patent.      Patented Nov. 21, 1905.

Application filed February 7, 1905. Serial No. 244,530.

*To all whom it may concern:*

Be it known that I, ARTHUR W. BARNARD, a citizen of the United States, residing at Newton Center, in the county of Middlesex and State of Massachusetts, have invented a new and useful Improvement in Weighing-Scales, of which the following is a specification, reference being had therein to the accompanying drawings.

My invention relates to even-balance and multiple-beam scales and the like, and pertains especially to devices on such scales for indicating excess or deficiency in weight of articles being weighed and the amount thereof.

The object of my invention is to secure a device which will operate as an indicator to the weigher when weighing articles in bulk and warn him when he approaches the desired weight, thus enabling him to weigh accurately without delay. In addition to the above a further object is to increase the sensitiveness of the scales and at the same time decrease the oscillations of the scale-beam in order that an object may be weighed accurately without the delay due to gradually-decreasing oscillations of the scale-beam, which are now noted in most scales.

A further object of my invention is to produce a device which when applied to scales will render the latter very sensitive, enable very small and minute bodies to be weighed accurately upon them, and also will indicate the excess or deficiency in weight between the object being weighed and the weight upon the other side of the scales.

The following is a clear description of my invention, reference being made to the accompanying drawings, in which—

Figure 1:
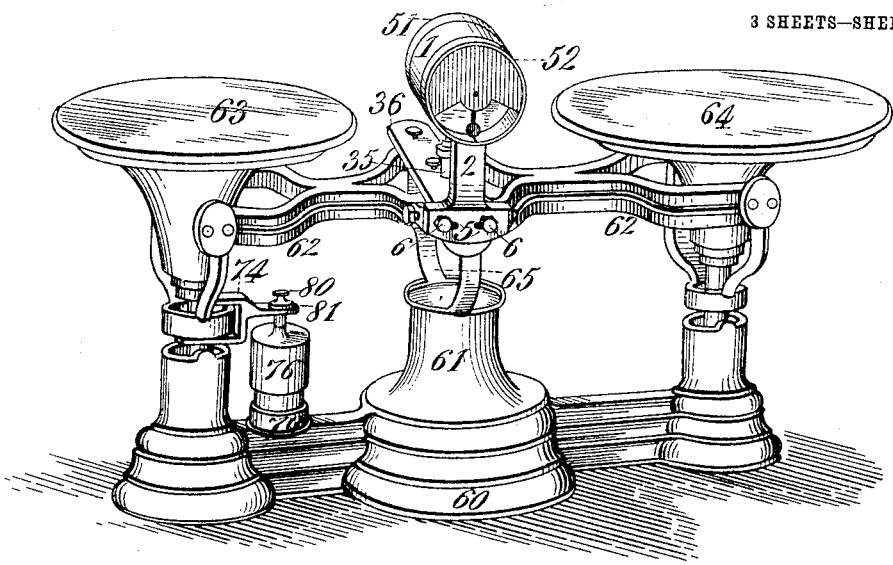
Figure 2:
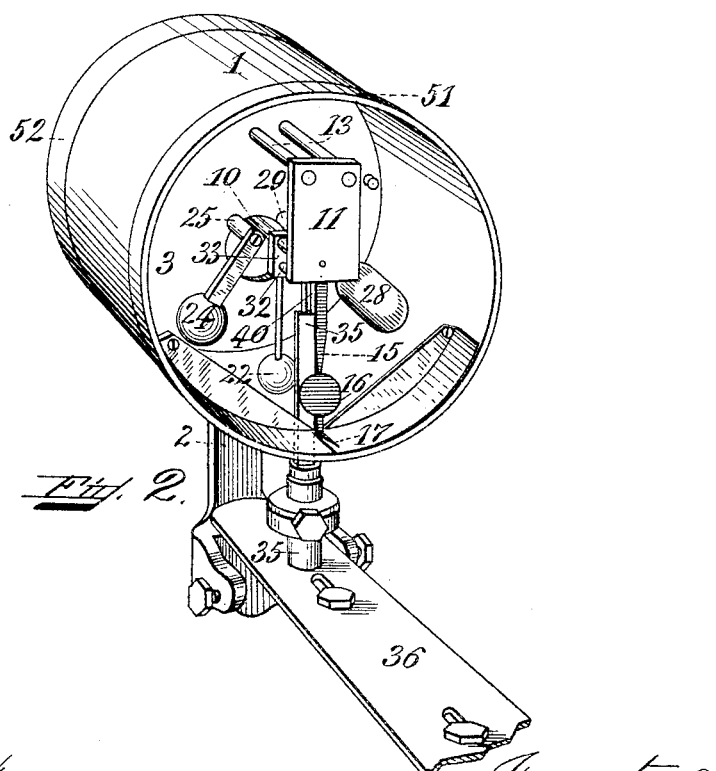

Figure 1 is a view in perspective of an even-balance scale having my device mounted thereon. Fig. 2 is a front view in perspective of my device with the dial and front plates removed to show the interior mechanism. Fig. 3 is a front elevation of my indicator. Fig. 4 is a front elevation of the indicator, the dial and plates being removed to expose the interior mechanism. Fig. 5 is a side elevation of the indicator. Fig. 6 is a vertical longitudinal sectional view on the line 6 6 in Fig. 3. Fig. 7 is a view of the upper portion of a multiple-beam scale, showing my device attached and adapted thereto. Fig. 8 is a front view of my device, the dial and front plates being removed, in which the operating means are adapted for attachment and use on multiple-beam scales, as shown in Fig. 7. Fig. 9 is a side elevation of the dash-pot. Fig. 10 is a central vertical sectional view of the same. Fig. 11 is a cross-sectional view of the same on line 11 11 in Fig. 9; and Fig. 12 is a cross-sectional view, on an enlarged scale, of the leaves of the piston of the dash-pot.

Similar numbers refer to similar parts throughout the several views.

In the drawings, 1 represents a case containing two dials and indicating mechanism, which is supported by a standard 2, attached to a central plate 3 within the case 1 by bolts 4 4, the lower end of the standard 2 being provided with slots 5 5 and attached to the scale by bolts or screws 6 6. Within the case 1 is the central plate 3, which divides the interior of the case into two chambers 8 and 9. Chamber 8, being termed the "front" chamber, contains most of the working mechanism, and when the indicator is mounted upon a scale that chamber is nearest the weigher and chamber 9, the rear chamber, is nearest the purchaser. The central plate 3 serves merely as a medium to which may be attached the supporting-standard 2 and some of the interior apparatus. The indicating mechanism consists of a shaft or arbor 10, mounted in plates 11 and 12, which plates are respectively supported by rods 13 and 14, set into the central plate 3.

On the front end of the shaft 10 is a hand or pointer 15, fixedly mounted so that the pointer turns with the shaft. The pointer has mounted near its point a small colored disk 16 to enable the eye more readily to follow the pointer in its movements, and in order that the exact position of the hand or pointer may be seen from above to obviate a close inspection of the dial each time an article is weighed the point 17 is turned outward horizontally. On the rear end of the shaft 10 is another hand or pointer 18, similarly mounted and containing the colored disk 19 and having its point 20 also bent outwardly. The front pointer 15 is for the information of the weigher and the rear hand 18 for the customer. As these two pointers are fixedly mounted and move together, the purchaser can always assure himself of a correct weight by observing the rear dial, which faces him when the scales are in use.

In the front chamber 8 to the shaft 10 is a weighted pendulum 22, rigidly secured, which also turns in unison with said pointers 15 and 18, the normal position of both pendulum and pointers being vertical. On the left of the weighted pendulum 22 is a second weighted pendulum or counterweight 24, which is pivotally attached to a support 25, set in the center plate 3 on the same level as the shaft 10, but slightly to the left thereof. Counterweight 24 is retained in an oblique position by a stop 26, set in the center plate 3, which engages a stop 27, set in the weight of the pendulum 24; but the latter is free to be rotated upwardly. On the right of pendulum 22 is a third weighted pendulum or counterweight 28, similarly mounted as pendulum 24 on the support 29 on the center plate 3 and retained in an oblique position by stops similar to stops 26 and 27. (See Fig. 6.) The object of counterweights 24 and 28 will be hereinafter explained. Underneath the front part of the shaft 10 is a short rod 32, its end fixed in plates 33 and 34, the latter plate being integral with the pendulum 22, which are securely fastened to the shaft 10, this rod 32 being used to rotate the shaft 10 in the following manner: A standard 35 is fixed to a saddle 36 of the scale and extends upwardly through an opening in the base of the case, its upper end having fixed therein two pins 40 40, which receive between them the rod 32 and when moved sidewise rotate the shaft 10. As the saddle 36 is fixed to the scale-beam in even-balance scales, any movement of the latter up or down will turn the former, and consequently the standard 35, to one side or the other, and thereby rotate the shaft 10. This causes the pointers to be moved to one side or the other, the amount of such movement depending upon the movement of the scale-beam. The standard 35 is so arranged with respect to the shaft 32 that when the scale-beam is exactly horizontal or balanced the pendulum 22 and pointers are vertical.

In the front and rear of my case, I provide dials 45 and 46, which are set just behind the hands or pointers. The upper parts, front and rear of the case, are concealed, respectively, by plates 47 and 48, and over them are placed glass plates 49 and 50, which are held in place by the circumferential rims 51 and 52. The dials may be graduated in any manner desired, zero being at the base of the dial, so that the hand hanging normally vertically will point to zero, overweight on one side and underweight on the other.

In Fig. 1 is shown an even-balance scale, having mounted thereon my indicating device and in which 60 represents a base, 61 a central standard, 62 a balanced arm or scale-beam, and 63 and 64 platforms, all of ordinary construction. To the framework 65, which springs from the central standard 61 and supports the scale-beam 62, is fixed the standard 2, which supports the indicator.

In the practical use of my device it has been found that the scale becomes so sensitive that the scale-beam continues to oscillate a considerable time before coming to a rest, which, while not interfering with the effective operation of the scale, yet prevents rapid weighing. For the purpose of reducing such oscillations to the minimum and bringing the scale-beam to a rest in the least fraction of time I provide a dash-pot 70. It is of special advantage to avoid the delay incidental to the vibrations of the scale-beam in order to enable salesmen to weigh rapidly and effect a saving of time.

The dash-pot device comprises an upright dash-pot or cylinder 70, containing glycerin, oil, or other suitable fluid 71, in which moves a piston 72, whose rod 73 is connected at its upper end to the scale-beam adjacent to the platform by means of a forked arm 74 and screw 75. Mounted upon the piston-rod 73 is a hood 76, which is not essential to the effective working of the dash-pot, but acts as a dust-protector. The piston 72 consists of two plates 77 and 78, provided with suitable orifices, one plate 77 being fixedly mounted upon the piston-rod 73, and the other plate 78 being affixed to the end of a smaller rod 79, which rotates within the hollow piston-rod 73. The rod 79 ends in a finger-piece 80, by which it may be turned, and a small spur or pointer 81 is fixed to the rod 79 underneath the finger-piece to indicate the position of the rod 79. By turning the latter rod and plate 78 the piston may be opened or closed, dependent upon whether the orifices on the plates coincide or not.

In the ordinary construction of dash-pots now in use the cylinder has been fixed or fastened to a support, such as the base or other part of the scale, and the piston-rod has been attached to the scale-beam. This construction is very objectionable and in time renders the scale inaccurate, for as the scale wears from use the points of the knife-bearings wear and permit of a sidewise movement of the scale-beam, thereby causing the piston in the dash-pot to come into contact with and rub upon the inside surface of the cylinder. The additional friction thus caused reduces the sensitiveness of the scale and results in a consequent loss to the merchant. This friction may be so great that a scale may be thus affected to the extent, say, of a quarter of a pound or more. By having my cylinder loose and unattached to any support I avoid the above difficulty, since the cylinder is merely supported by the base of the scale and will slide sidewise to prevent any friction between the piston and the cylinder owing to the lubricating power of the oil or glycerin in the cylinder.

For the purpose of further reducing the friction in the dash-pot by permitting the piston to cut through the oil or glycerin, I bevel or round the outer circumference of the piston-plates 77 and 78, as shown in Fig. 12 on an enlarged scale, and also bevel the edges of the orifices in each plate in such a manner that when the piston is fully open a sharp cutting edge is formed where the two plates face together and the piston easily cuts through the oil or glycerin. This construction has been found in practice to increase to a great extent the sensitiveness of my device to such an extent, in fact, that on an ordinary scale, as shown in Fig. 1, thus equipped, one one-hundredth and twenty-eighth of an ounce can be shown.

Although this dash-pot device is shown and described here, it is not claimed, as it is the subject of a separate application for Letters Patent, Serial No. 258,885, filed May 4, 1905.

In applying my device to multiple-beam scales it is necessary to change slightly in construction the means whereby the shaft 10 is rotated by the movement of the scale-beam, which changes are fully illustrated in Figs. 7 and 8 of the drawings. In Fig. 7, 90 represents a support of the scale; 91, a table on which is mounted a multiple-beam 92, balanced on a standard 93; 94, an equalizing-weight hung upon the free end 95 of the beam 92; 96, a sliding weight, and 97 a screw-weight. Upon the table 91, just beyond the free end 95 of the beam 92, I mount my indicator and connect it to the scale-beam by means of a J-shaped rod 98, the upper end of which is fastened to the scale-beam, and the lower portion of the rod is turned upwardly in the form of the letter J, enters the base of the case, and ends at a point horizontally to the left of the shaft 10. That end of the rod 98 is provided with pins 99 99, which engage a small rod 100, mounted horizontally on the shaft by means of supports 101. By means of this construction any upward or downward movement of the scale-beam moves the rod 98 and turns the shaft and weighted pendulum. My dash-pot I mount upon the other end of the table 91 and attach the piston to the short end of the beam 92; but the dash-pot may be mounted and attached to the scale-beam at any point where it will not interfere with the sliding weight and yet be far enough away from the standard 93 to affect the oscillations of the beam.

The operation of my device is as follows: The device is first adjusted to the scale in such a manner that when the scale-beam is exactly horizontal the standard 35 is vertical, the pendulum hangs vertically, and the pointer is at zero. Any movement of the beam up or down thereupon turns the standard to one side or the other, and the pins in the end of the standard carry with them the auxiliary bar 32 and turn the weighted pendulum and the pointer in unison. When the pressure is released, the weighted pendulum swings back to its normal position and brings the scale-beam to a horizontal. Under such circumstances the dash-pot stops the natural oscillations of the beam and forces it to come to a stop almost immediately.

The operation of weighing by my device is as follows: When the desired weight is placed on platform 64, it depresses that side of the balanced arm or scale-beam and raises the other side. Also it turns the standard 35 to the right, and thereby turns the weighted pendulum and pointer toward the right, denoting underweight. If the object to be weighed is then placed upon the opposing platform 63 and is of less weight than the weight on the platform 64, the latter platform will still be lower than the former platform, and so long as it remains thus the pointer will be turned toward the right, indicating underweight, and if the dial be marked in pounds and ounces the pointer will indicate the amount of said underweight. If, however, the object on platform 63 is heavier than the weight on platform 64, the former platform will be depressed and the latter raised, in consequence of which the standard 35 causes the pendulum and pointer to turn to the left, denoting overweight and the amount. In all these weighing operations the dash-pot device reduces the usual oscillations of the scale-beam. Thus employed my device indicates the excess or deficiency in weight of the object to be weighed over the desired weight. This feature will be found of special advantage in weighing different single articles rapidly, for to find the weight of any article all that is required is to place in the left platform a weight approximating that of the article to be weighed and in the right platform the article, and immediately the pointer indicates the amount of overweight or underweight, which can be subtracted from or added to the weight in the left-hand platform, and the weight of the article is secured accurately, avoiding the necessity of changing or shifting weights until the scale-beam is balanced. Further, articles within the range of the dial, which range of course depends upon the size of my indicator and the weight and the length of the pendulums, may be weighed by simply placing them upon one platform of the scales, and the pointer will indicate the weight.

In weighing articles such as sugar, rice, &c., in bulk my device is of special value, owing to the fact that it gives the dealer notice when he is approaching the desired weight and enables him to avoid overweight. For instance, a dealer wishes to weigh five pounds of sugar. He places a five-pound weight upon platform 64 and then pours the sugar from a scoop into a bag or other receptacle upon platform 63. As he approaches the desired weight the pointer, which has heretofore been turned to the right or underweight side, begins to turn toward zero, slowly at first and then more rapidly, and when the pointer has reched zero the dealer is assured of an exact weight of five pounds.

When the five-pound weight was first placed on platform 64, the pendulum 22 was turned upwardly toward the right until it came into contact with the auxiliary pendulum or counterweight 28, which it then carried with it to a nearly horizontal position. The up-and-down movement of the scale-beam is limited, and consequently my pendulum 22 only moves in an arc of about one hundred and eighty degrees, ninety on each side of zero. When the pointer begins to move downwardly, it moves very slowly, owing to the counterweight 28; but as soon as pendulum 22 swings free from 28 it moves rapidly and is very sensitive to slight weights. The dealer knowing this can tell from the position of the pointer about when pendulum 22 leaves counterweight 28, and he then knows that a very slight addition to the sugar will bring the pointer to zero. Practically, the slow movement of the pointer in the first portion of its journey downward prepares him for the rapid final movement by giving him a long signal.

In addition to giving a long signal the counterweights also increase the weighing capacity of my device, as it is evident that it requires more weight to raise the pendulum and counterweight than the pendulum alone. If desired, other counterweights may be added in addition to those shown; but I have found two to be the preferable number.

It is apparent from the above that my device has the practical effect of removing all the friction from the bearings in the scale to which it is applied, making the scales frictionless, and consequently extremely sensitive.

My device may be adapted to scales of any size by merely changing the length and weight of the pendulum and counterweight and by marking the dial to correspond. Even when applied to the largest scales used my apparatus will render the scales so sensitive that they will weigh more accurately and finer than is now possible.

In claiming my invention I do not desire to limit myself to the exact construction herein shown, but desire to claim my invention in the broadest manner legally possible.

What I claim is—

1. In a scale, the combination of a scale-beam, a weighted pendulum mounted upon a shaft or arbor, a counterweight mounted beside and adapted to contact said weighted pendulum, a dial properly marked, a pointer mounted on said shaft and coöperating with said dial, and means whereby said weighted pendulum is swung relatively to the movement of said scale-beam.

2. In a scale, the combination of a scale-beam, a weighted pendulum mounted upon a shaft or arbor, a plurality of counterweights mounted beside and adapted to contact said pendulum, a dial properly marked, a pointer mounted on said shaft and coöperating with said dial, and means whereby said weighted pendulum is swung relatively to the movement of said scale-beam.

3. In a scale, the combination of a scale-beam, a dial properly marked, a pointer coöperating with said dial, a weighted pendulum mounted upon a shaft or arbor and moving in unison with said pointer, one or more counterweights independently mounted beside and adapted to contact said pendulum, and means whereby said weighted pendulum is connected to said scale-beam and swung by its movement.

4. In a scale, the combination of a shaft or arbor mounted in suitable bearings, a weighted pendulum fixedly mounted upon said shaft or arbor, a counterweight pivotally mounted adjacent to said weighted pendulum to coöperate with it, a dial properly marked to indicate underweight and overweight, a pointer coöperating with said dial and moving in unison with said weighted pendulum, and means whereby any movement of the scale-beam causes a relative movement of said weighted pendulum and pointer.

5. In a scale, the combination of a scale-beam, a shaft or arbor mounted in suitable bearings, a weighted pendulum fixedly mounted upon said shaft or arbor, counterweights pivotally mounted on each side of and adjacent to said weighted pendulum to coöperate with it, a dial properly marked to indicate underweight and overweight, a pointer fixedly mounted upon said shaft, coöperating with said dial and moving in unison with said weighted pendulum, and means whereby any movement of the said scale-beam causes a relative movement of said weighted pendulum and pointer.

6. In a scale, the combination of a dial properly marked to indicate underweight and overweight, a hand or pointer coöperating with said dial, a weighted pendulum fixedly mounted upon a shaft or arbor and hanging normally vertically and moving in unison with said pointer, a plurality of counterweights pivotally mounted beside said weighted pendulum and so adjusted that they may contact the said weighted pendulum, and means whereby said weighted pendulum is rotated relatively to the movement of the scale-beam.

7. In a scale, the combination of a weighted pendulum fixedly mounted upon a shaft or arbor and hanging normally vertical, a counterweight pivotally mounted adjacent to said weighted pendulum to coöperate with it and retained in an oblique position by a stop which permits an upward movement only, said stop, a pointer fixedly mounted upon said pendulum-shaft and moving in unison with said weighted pendulum, a dial properly marked to indicate overweight and underweight with which said pointer coöperates, and means whereby said weighted pendulum is swung by the movement of the scale-beam.

8. In a scale, the combination of a weighted pendulum mounted upon a shaft or arbor, a counterweight mounted adjacent to said pendulum to coöperate with it, a dial, a pointer coöperating with said dial, and a standard fixedly mounted on a scale-beam and having its end provided with means to engage and rotate said shaft when the scale-beam moves.

9. In a scale, the combination of a scale-beam, a dial properly marked, a pointer coöperating with said dial, a weighted pendulum mounted upon a shaft or arbor and moving in unison with said pointer, one or more counterweights mounted adjacent to said pendulum to coöperate with it and having a limited movement, and a standard fixed to said scale-beam and having its end provided with means to engage and rotate said shaft when said scale-beam moves.

10. In a scale, the combination of a scale-beam, a shaft or arbor mounted in suitable bearings, a weighted pendulum fixedly mounted upon said shaft or arbor, counterweights pivotally mounted on each side of and adjacent to said weighted pendulum to coöperate with it, a pointer fixedly mounted upon said shaft and moving in unison with said weighted pendulum, a dial properly marked with which said pointer coöperates, a standard fixed to said scale-beam and having its end provided with pins which engage and rotate said shaft when said scale-beam oscillates.

11. In a scale, the combination of a scale-beam, a weighted pendulum fixedly mounted upon a shaft or arbor, a counterweight independently mounted beside said weighted pendulum and adapted to contact it when it is oscillated, a dial properly marked, a pointer coöperating with said dial and moving in unison with said weighted pendulum, and means whereby said weighted pendulum is swung relatively to the movement of said scale-beam.

12. In a scale, the combination of a scale-beam, a weighted pendulum mounted upon a shaft or arbor, a counterweight mounted adjacent to, and so adjusted that it may contact said pendulum, a dial, a pointer coöperating with said dial, and means whereby said weighted pendulum is swung relatively to the movement of said scale-beam.

13. In a scale, the combination of a scale-beam, a dial properly marked, a pointer coöperating with said dial, a weighted pendulum mounted upon a shaft or arbor and moving in unison with said pointer, one or more counterweights independently mounted adjacent to and capable of a limited movement to retard said pendulum, and means whereby said weighted pendulum is connected to said scale-beam and swung thereby.

14. In a scale, the combination of a scale-beam, a shaft or arbor mounted in suitable bearings, a weighted pendulum fixedly mounted upon said shaft or arbor, a counterweight pivotally mounted adjacent to said weighted pendulum to retard it, a dial properly marked to indicate underweight and overweight, a pointer coöperating with said dial and moving in unison with said weighted pendulum, and means whereby any movement of said scale-beam causes a relative movement of said weighted pendulum and pointer.

15. In a scale, the combination of a scale-beam, a shaft or arbor mounted in suitable bearings, a weighted pendulum fixedly mounted upon said shaft or arbor, counterweights pivotally mounted on each side of and adjacent to said weighted pendulum and adapted to contact the latter to retard its movement, a dial properly marked to indicate underweight and overweight, a pointer fixedly mounted upon said shaft, coöperating with said dial and moving in unison with said weighted pendulum, and means whereby any movement of the said scale-beam causes a relative movement of said weighted pendulum and pointer.

16. In combination with the beam of a scale, a shaft or arbor mounted in suitable bearings, a weighted pendulum fixedly mounted upon said shaft or arbor, a counterweight pivotally mounted to retard the movement of said weighted pendulum, a pointer also fixedly mounted upon said shaft and moving in unison with said weighted pendulum, a dial properly marked to indicate overweight and underweight with which said pointer coöperates, and means whereby any movement of the scale-beam causes a relative movement of said weighted pendulum and pointer.

17. In a scale, the combination of a scale-beam, a shaft or arbor mounted in suitable bearings, a weighted pendulum fixedly mounted upon said shaft or arbor, counterweights pivotally mounted on each side of and adjacent to, and adapted to contact said weighted pendulum to retard its movement, a dial properly marked to indicate underweight and overweight, a pointer fixedly mounted upon said shaft, coöperating with said dial and moving in unison with said weighted pendulum, and a standard fixedly mounted on said scale-beam and having its end provided with means to engage and rotate said shaft or arbor when the scale-beam moves.

18. In a scale, in combination with the moving member thereof, a shaft or arbor rotatably mounted in suitable bearings, a weighted pendulum fixedly mounted on said shaft, a counterweight pivotally hung on each side of and adjacent to and adapted to contact said weighted pendulum when the latter is turned, means to retain said counterweights in an oblique position but which permit an upward movement thereof, a dial marked to indicate underweight and overweight, a pointer fixedly mounted upon said shaft, coöperating with said dial and moving in unison with said weighted pendulum, and means whereby said pendulum and pointer are turned relatively to the movement of the moving member.

19. In a scale, the combination of a scale-beam, a weighted pendulum mounted upon a shaft or arbor, a counterweight mounted adjacent to said weighted pendulum to coöperate with it, means whereby said weighted pendulum is swung relatively to the movement of said scale-beam, and means whereby the movement of said weighted pendulum indicates overweight or underweight of the article being weighed.

20. In a scale, the combination of a scale-beam, a weighted pendulum mounted upon a shaft or arbor, a plurality of counterweights independently mounted adjacent to said pendulum to coöperate with it, means whereby said weighted pendulum is swung relatively to the movement of said scale-beam and means whereby the movement of said pendulum indicates the overweight or underweight of the article being weighed.

21. In a scale, the combination of a scale-beam, a shaft or arbor mounted in suitable bearings, a weighted pendulum fixed upon said shaft or arbor, a counterweight mounted on each side of and adjacent to said weighted pendulum and adapted to contact the latter to retard its oscillations, means whereby said weighted pendulum is turned relatively to the movement of the scale-beam and means whereby said movement of the pendulum indicates the excess or deficiency in weight of the article being weighed.

22. In a scale, the combination of a scale-beam, a shaft or arbor mounted in suitable bearings, a weighted pendulum mounted on said shaft, a plurality of counterweights independently mounted adjacent to said weighted pendulum and retained in an oblique position by stops which permit an upward movement only of said counterweights, said stops, means whereby said weighted pendulum is turned relatively to the movement of said scale-beam, and means whereby the movement of said pendulum indicates the overweight or underweight of the article being weighed.

23. In a scale, in combination with the moving member thereof, a shaft mounted in suitable bearings, a weighted pendulum fixedly mounted on said shaft, a counterweight pivotally hung on each side of and adjacent to and adapted to contact said weighted pendulum when the latter is oscillated, said counterweights being retained in an oblique position by stops which permit an upward movement only, said stops, means whereby said pendulum is turned relatively to the movement of said moving member of the scale, and means whereby said movement of the pendulum indicates the excess or deficiency in weight of the article being weighed.

24. In an indicator for scales, the combination of a case or housing, a shaft or arbor mounted within said case in suitable bearings, a weighted pendulum mounted upon said shaft, a plurality of counterweights independently mounted adjacent to and adapted to contact said pendulum to retard its movement, means whereby said pendulum is turned relatively to the movement of the moving part of the scale and means whereby the said movement of the pendulum shows the amount of excess or deficiency in weight of the article being weighed.

25. In an overweight-indicator for scales, the combination of a scale-beam, a suitable case or housing, a shaft or arbor mounted within said case in suitable bearings, a weighted pendulum mounted upon said shaft, counterweights independently mounted adjacent to and coöperating with said pendulum, means whereby said pendulum is turned relatively to the movement of said scale-beam and means whereby said movement of the pendulum indicates the amount of excess or deficiency in weight of the article being weighed.

26. In an indicator for scales, the combination of a suitable case or housing, a shaft or arbor mounted within said case, a weighted pendulum, mounted upon said shaft, a plurality of counterweights independently mounted adjacent to and coacting with said pendulum to retard its movement, a dial, a pointer fixed on said shaft to coöperate with said dial and moving in unison with said weighted pendulum, and means whereby the moving member of the scale operates the above mechanism to indicate the excess or deficiency in weight of the article being weighed.

27. The combination of a weighted pendulum 22 mounted upon a shaft or arbor 10, counterweights 24 and 28 pivotally mounted adjacent to said pendulum 22 to contact the latter to retard its movement, a dial 45 properly marked with graduations to indicate overweight and underweight, a pointer 15 fixedly mounted upon shaft 10, coöperating with said dial 45 and moving in unison with said pendulum 22, a scale-beam and means whereby any movement of said scale-beam causes a relative movement of the said pendulum 22 and thereby indicates upon said dial the overweight or underweight of the article being weighed.

In testimony whereof I have hereunto set my hand, in the presence of two subscribing witnesses, this the 13th day of January, 1905.

ARTHUR W. BARNARD.

Witnesses:
CHARLES F. RICHARDSON,
E. F. UNIAC.